March 25, 1958 — P. TALMEY ET AL — 2,828,025
FLOUR STORAGE BIN

Filed Dec. 6, 1949 — 3 Sheets-Sheet 1

INVENTORS.
Paul Talmey,
BY Richard W. London,
Smith, Olsen & Baird,
Attys.

March 25, 1958  P. TALMEY ET AL  2,828,025
FLOUR STORAGE BIN

Filed Dec. 6, 1949  3 Sheets-Sheet 2

INVENTORS.
Paul Talmey,
BY Richard W. Landon
Smith, Olsen & Baird
Attys.

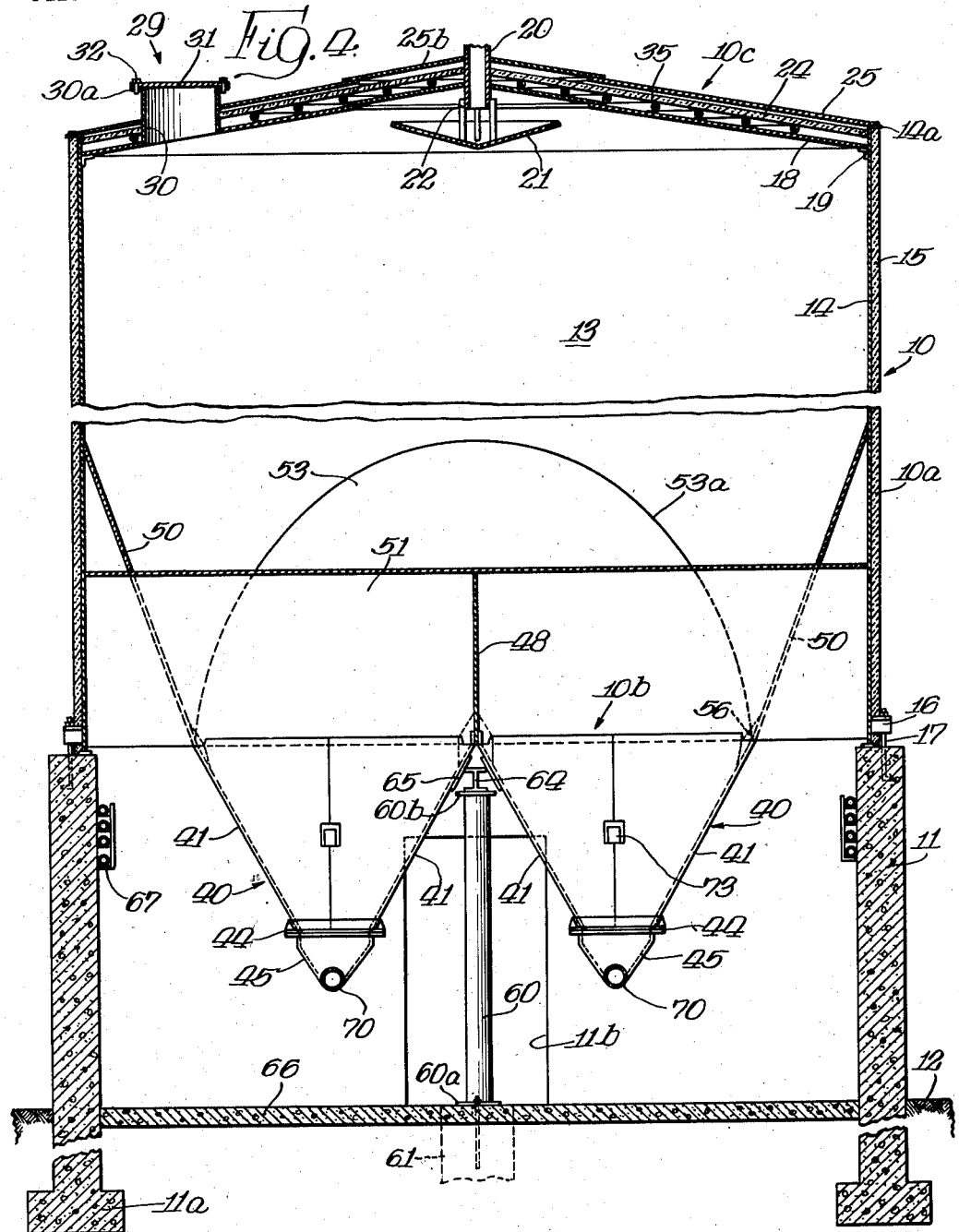

United States Patent Office 2,828,025
Patented Mar. 25, 1958

2,828,025

FLOUR STORAGE BIN

Paul Talmey, Barrington, and Richard W. Landon, Skokie, Ill., assignors to General American Transportation Corporation, Chicago, Ill., a corporation of New York Application December 6, 1949, Serial No. 131,322

7 Claims. (Cl. 214—17)

This invention relates to improvements in flour storage bins and its purpose is to provide improved means for storing flour and other finely divided materials in large volume without deterioration from atmospheric conditions or other causes.

Heretofore, it has been difficult or impossible to store flour and the like in large bulk in unheated storage bins without serious damage resulting from the absorption by the flour of moisture from the surrounding atmosphere. This has caused the flour to cake and to deteriorate in quality and has interfered with the unloading of the flour from the storage chambers. While flour has been stored in bulk in large volume this has always been done inside of heated buildings or with the use of a double walled storage bin having a heating medium circulating between the walls.

The present invention is based upon the discovery that there is no danger of condensation resulting merely from the contact of the flour with a cold wall of a storage chamber and that the above mentioned difficulty arises from the contact of the more or less warm air above the load with walls which are at a lower temperature, thus resulting in condensation of the moisture in this body of air with consequent contamination of the flour. If the walls of the storage chamber in contact with the body of air above the flour are maintained at a temperature at or above the temperature of this body of air, the danger of condensation does not arise.

The primary object of the present invention, therefore, is to overcome the above mentioned difficulties, and others, by providing an improved storage bin having means for controlling the temperature of the walls of the bin above the load in order to prevent the condensation of moisture contained in the body of air above the load and the absorption thereof by the load, which may be flour or other material likely to be affected by moisture. A further object of the invention is to provide a closed storage bin for finely divided materials adapted to be located in an unheated area exposed to the weather and having means for heating the walls of the bin above the materials in order to prevent the condensation of moisture present in the body of air above the load. Still another object of the invention is to provide a storage bin provided with means for heating its ceiling or roof and thereby preventing the condensation of moisture contained in the air over the materials in the bin. A further object of the invention is to provide improved means for discharging the contents of the storage bin including a plurality of discharge hoppers distributed beneath the area of the bin and having inclined walls which facilitate the discharge of the contents of the bin. Other objects relate to various features of construction and arrangement which will appear more fully hereinafter.

The nature of the invention will be understood from the following specification taken with the accompanying drawings in which one embodiment is illustrated. In the drawings, Figure 1 shows a top plan view of a flour storage bin embodying the features of the present invention;

Fig. 4 shows a vertical section taken on the line 4—4 of Fig. 1.

Figure 1:
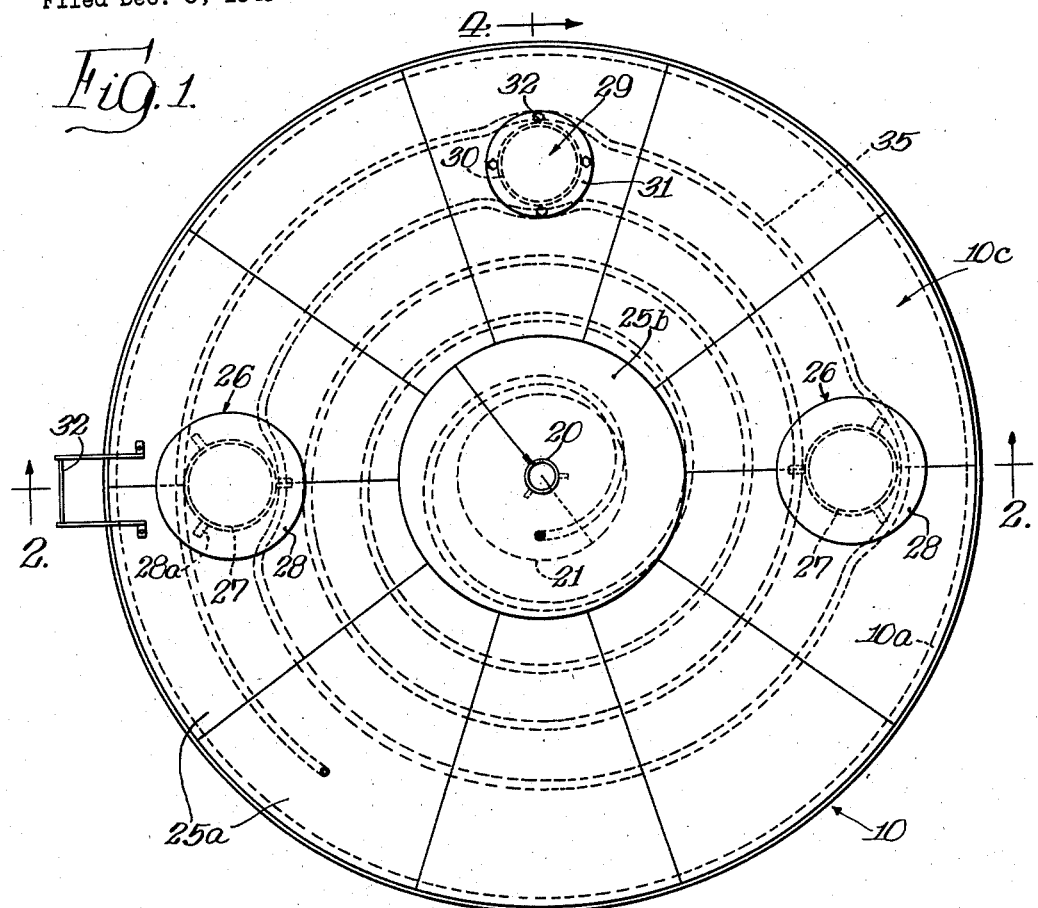

As shown in the drawings, the flour storage bin 10 of circular horizontal cross section is mounted upon an annular concrete base 11 which has its lower part partially embedded in the earth 12 and provided within the earth with an annular enlargement 11a adapted to give a greater area of support. The storage bin 10 comprises an upright cylindrical wall 10a which rests upon the base 11, a bottom closure 10b through which the flour or other finely divided material is discharged from the interior chamber of the storage bin, and a top wall or roof 10c through which the materials to be stored are introduced. There is thus formed an internal storage chamber 13 for the finely divided materials.

The annular wall 10a comprises a rigid wall 14, formed preferably of steel or the like, which is surrounded by a layer of heat insulating material 15 which may preferably be a foamed plastic, fiber glass or other vitreous filament insulating material. The wall 14 may also be formed of concrete or other structural material. The wall 14 is provided at intervals around its bottom edge with outwardly projecting lugs 16 engaged by anchor bolts 17 which are partially embedded in the concrete base 11 for the purpose of holding the storage bin 10 securely in position.

The top wall or roof 10c comprises an inner wall 18, formed preferably of steel or the like, which is secured at its outer edge to the wall 14 by means of angle bars 19 welded or otherwise secured to both of the wall sections. The wall 18 is in the form of a relatively flat cone having its center at the vertical center line of the storage bin and at this point, an inlet conduit 20 passes through the wall 18 to permit the introduction of flour or other finely divided material under pressure or by gravity into the storage chamber 13. An inverted cone-shaped pan 21 is secured to the lower end of the conduit 20 by means of a series of bars 22 so that the flour or other material, upon being introduced into the car, spreads out laterally toward the outer wall 10a, thus tending to produce a substantially flat top on the body of material within the storage chamber 13 and a top surface which may be located in comparatively close proximity to the wall 18. It will be noted that the apex of the cone-shaped spreader 21 is located above the horizontal plane of the outer margin of the wall 18 and by distributing the flour or other finely divided material laterally from the member 21 it is possible to fill the storage chamber 13 substantially to its upper limit and thus reduce the amount of air space which is present above the load.

The top wall or roof 10c also comprises a wall section or layer 24, formed of heat insulating material such as that of which the layer 15 is formed, which is spaced upwardly from the wall 18. Above the wall section 24 there is located a top roof section 25 which is preferably formed of shet metal and which has its outer edges resting upon and welded to the out-turned edges 14a of the annular wall 14. As shown particularly in Fig. 1, the top metal wall 25 may be made up of a plurality of segments 25a which are welded together at their contacting edges. These segments 25a extend inwardly to a point which is located outwardly from the outer margin of the distributing member 21 and, from that point, the top wall section 25 is completed by a circular plate 25b which overlaps and is welded to the inner edges of the segments 25a and which is perforated at its center for engagement by the inlet conduit 20.

At diametrically opposite points, the top wall or roof 10c is provided with air vents 26 each made up of a tube 27 which extends downwardly through and is secured to the roof members 18 and 25. The upper end of each member 27 has a cone-shaped hood 28 mounted thereover in inverted position and secured thereto by brackets 28a, thus forming an air channel between the upper end of each tube 27 and its hood 28 through which air may pass to and from the storage chamber 13. In addition, the top wall or roof 10c is provided with a manhole 29 comprising a metal tube 30 which extends through and is secured to the wall portions 18 and 25 and which is normally closed at its upper end by a cover 31 secured by bolts 32 to the out-turned flange 30a thereof. For gaining access to the roof 10c, a ladder 32 is secured to one side of the storage bin 10 by means of metal struts 33 and this ladder is continued down the side of the concrete base 11 by means of metal steps 34 which are partially embedded in the concrete.

For the purpose of controlling the temperature of the metal walls above the upper surface of the flour or other finely divided material which is stored therein, means are provided for applying heat to the top wall or roof 10c. This is done by means of a tubular heating coil 35 which is arranged in spiral fashion around the central inlet conduit 20. The convolutions start near the conduit 20 and increase progressively in diameter as the outer margin of the roof section 10c is approached. The ends of this heating coil 35 may be connected in a steam circulating system which may be thermostatically controlled, if desired, in order to regulate the admission of steam in accordance with the temperature of the walls of the chamber 13 above the upper surface of the contents of the chamber, or the regulation may be effected in any other desired way in order to maintain such a temperature of the walls in contact with the air above the materials in the chamber as will prevent the condensation of moisture from this air. The steam circulating in the heating coil 35 serves to heat the inner wall 18 of the roof 10c and if the chamber 13 is not entirely filled up to the outer margin of the wall 18, the heat radiating from the wall 18 will serve to heat the upper exposed portions of the wall 14 so that all of the walls above the finely divided materials in the chamber will be heated to a point where they are not colder than the air in the chamber 13 which is above the load, thus preventing any possibility of condensation of moisture from the air which would be absorbed by the finely divided materials with possible deterioration thereof. By employing the distributing member 21 for spreading the flour or other material as it enters the chamber 13, it is ordinarily possible, upon initial loading, to fill the chamber to such an extent that there is only a relatively small air space above the load but, as the contents of the storage bin are removed by successive increments, the air space above the load in the chamber 13 may increase and, since there is some air circulation through the vents 26, it is necessary to vary the heat applied through the heating coil 35 in such a way as to maintain the exposed metal walls above the load at a temperature at least as high as that of the air in the chamber above the load. If the storage bin be made extremely high in relation to its transverse dimension, it may be desirable to continue the heating element downwardly around the wall 14 to insure the heating of that portion of this wall which is located above the load.

Figure 3:
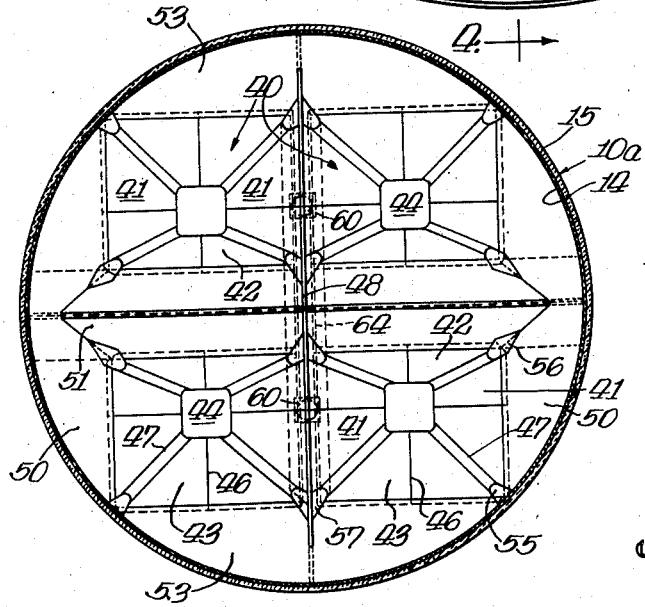
Fig. 3 shows a horizontal section, on a reduced scale, taken on the line 3—3 of Fig. 2.
Figure 2:
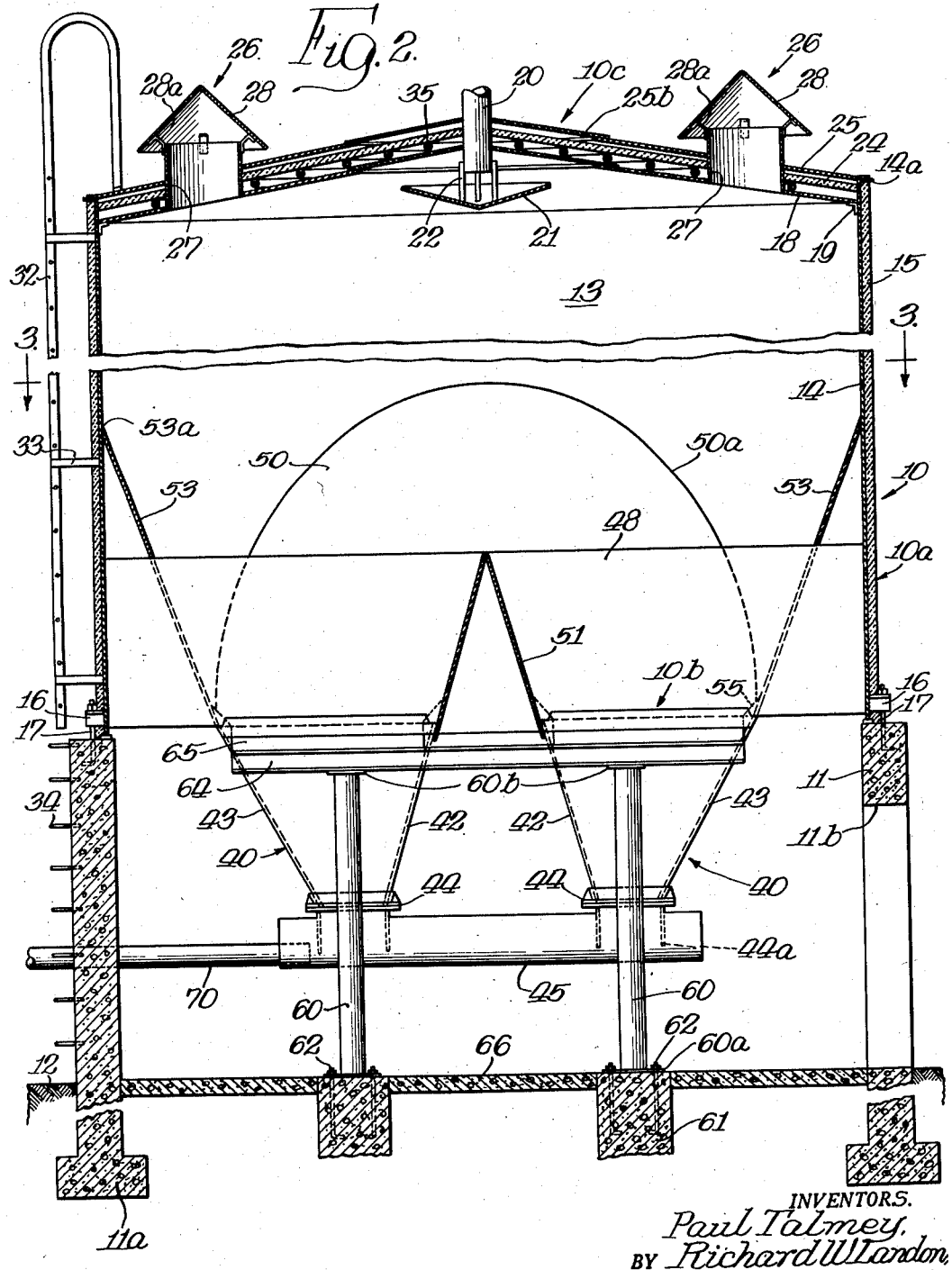
Fig. 2 shows a vertical section taken on the line 2—2 of Fig. 1.

The flour or other material stored in the chamber 13 is discharged through the bottom closure 10b which is made up of a plurality of separate discharge hoppers each communicating with the body of the chamber as illustrated particularly in Figs. 2, 3 and 4. In this construction, there are four discharge hoppers 40 which are arranged in pairs in two right angular directions and in symmetrical relationship to the annular wall 10a of the storage bin. The lower discharge portion of each hopper is made up of two inclined side plates 41, an inner plate 42 and an outer plate 43 which converge downwardly and discharge through housings 44 into discharge conduits 45. A single conduit 45 takes the discharge from two hoppers 40 which are located opposite to each other. The plates or hopper wall portions 41, 42 and 43 may be formed of two metal sheets which are united along lines 46 and which are bent along lines 47 at the corners of the hopper to provide a hopper of horizontal, rectangular cross section. The plates or wall sections of the lower part of each hopper are inclined at relatively steep angles, substantially greater than the angle of repose of the materials stored in the chamber 13 so that the materials will slide freely thereover during the discharge operation. For example, in the embodiment illustrated, the plates 41 make an angle of 61° with the horizontal, the plate 42 makes an angle of 74° with the horizontal, and the plates 43 make angles of 62° to the horizontal.

At their upper extremities, the plates or wall sections 41, 42 and 43 are united with other wall portions by which each hopper is continued upwardly a substantial distance to points above the lower margin of the annular wall 14 of the storage bin. At their upper extremities the inclined wall portions 41 of two adjacent hoppers are united with each other and with an upright division wall 48 which extends transversely of the storage bin and has its ends united with the annular wall 14, as shown in Fig. 4. The outer inclined wall portions 41 of these two hoppers are united at their upper ends with inclined plates 50 which have arcuate edges 50a welded to the cylindrical wall 14. These hopper wall portions 50 have relatively steep inclines, very much greater than the angle of repose of the materials stored in the chamber. For example, in the embodiment illustrated, these plates make angles of 70° with the horizontal.

The other lower wall portions 42 and 43 of each hopper are similarly united at their upper edges with other plates by which the hoppers are continued upwardly. The two inner plates 42 of two oppositely disposed hoppers are united with an inverted V-shaped member 51 which extends transversely of the storage bin with its ends secured to the wall 14, thus providing a baffle wall or division plate between two adjacent hoppers, having comparatively steep slopes on its opposite sides so that the material in the storage bin is caused to flow readily into the hoppers. At the outer sides of the two oppositely disposed hoppers, the plates or wall portions 43 are united at their upper edges with metal plates 53 having upper margins 53a of arcuate form which are welded to the circular metallic wall 14. These plates 53 are split to receive the division wall 48 to which they are welded or otherwise secured and they are inclined at relatively steep angles as, for example, angles of 70° to the horizontal in the embodiment illustrated. The plates 50 which extend upwardly from the wall 41 previously described are notched at their lower edges to receive the V-shaped division wall 51 and these notched edges are secured to the member 51 by welding or the like.

At the upper corners of the lower portions of the hoppers, formed by the wall sections 41, 42 and 43, these wall sections are united with the connected plates above by means of a series of corner plates 55, 56 and 57 which are welded to the contacting plates and which are adapted to increase the strength of the structure and also to eliminate pockets or crevices in which the flour or other finely divided material might cake. When all of the plates have been secured together to form the storage bin having a metallic inner wall or lining as described above, the interior surfaces of the metal plates forming the storage bin are preferably sand blasted in order to provide a smooth finish throughout the interior of the storage bin.

The storage bin is supported independently of the base 11 by means of a pair of posts or pedestals 60 which extend upwardly from concrete abutments 61 embedded in the earth 12. The lower flange 60a of each post or pedestal is engaged by anchor bolts 62 which are embedded in the concrete of the underlying abutment 61. The upper ends of the pedestal 60 are provided with flanges 60b to which there is secured an I-beam 64 extending diametrically of the storage bin with its top flanges engaging reinforcing plates 65 which are welded to the adjacent hopper walls 41 of each of two pairs of hoppers. A concrete floor 66 extends throughout the area of the storage bin inside of the annular base 11 at the ground level and the base 11 is provided at one side with a door opening 11b through which access may be had to the chamber which is thus formed around the lower parts of the hoppers. In order to heat this space for the comfort of persons working therein it is preferably provided with steam radiators 67 which are mounted on the inside of the base 11.

The discharge casings 44 which are provided at the lower discharge openings of the hoppers 40 are provided with plates 44a which extend downwardly into the discharge conduit 45 and the flour which is discharged from the hoppers is carried by a suction through pipe 70 which is connected to a suitable form of suction apparatus for withdrawing the flour from the storage bin at the desired rate. To insure the free discharge of the flour or other material, the lower portion of each hopper 40 may be provided with guides 73 adapted to interlock with vibrators adapted to vibrate the walls of the hoppers during the discharge.

By means of the foregoing arrangement of parts it will be apparent that there has been provided an improved storage bin for flour or other finely divided materials which tend to deteriorate or to lose their capacity for flowing freely when subjected to the action of moisture. By suitably heating the metallic walls of the storage bin to which the flour or other material is exposed through an intervening air space, it is possible to prevent the condensation of moisture from the air in this space by maintaining the temperature of the metallic walls at all times at a point equal to or greater than the temperature of the air in the space. Although the desired results may be obtained by maintaining the temperature of the walls which are exposed to the load through the intervening air space above the dew point of the air in this space, it is preferable, and more simple, as a practical matter, to obtain the desired condition by maintaining the temperature of these walls above the temperature of the air. The difficulties heretofore encountered with outside storage bins exposed to temperature fluctuations and weather changes are thereby overcome and it is possible to store very large quantities of finely divided materials in bulk without deterioration of the materials and without reducing the capacity of the materials for flowing freely when subjected to the action of suction through the discharge hoppers. By employing a plurality of closely spaced discharge hoppers having relatively steep walls, the free flow of the materials during discharge is facilitated.

Although one form of the invention has been shown and described by way of illustration, it will be understood that it may be constructed in various other embodiments without departing from the scope of the appended claims.

We claim:

1. A storage bin for preserving in a dry state finely divided perishable materials comprising an annular upright wall, a top wall over the upper end of said annular wall, an inlet conduit extending through the central portion of said top wall for introducing said materials into the space within said annular wall, means mounted beneath said inlet conduit for spreading the materials discharged by said conduit over the area within said annular wall, heat insulating means on the outer sides of said upright wall and said top wall, and a spiral heating coil mounted on the upper side of said top wall and below the heat insulating material on said top wall.

2. A storage bin for preserving in a dry state finely divided perishable materials comprising an enclosing upright wall, a top wall united with the upper end of said upright wall, means for introducing said materials through said top wall, means extending through said top wall for permitting the access of air to the space above the materials within said enclosing wall, and means for independently heating only said top wall and the portions of said upright wall surrounding said space in order to control the temperature of the air in said space.

3. A storage bin for preserving in a dry state finely divided perishable materials comprising walls forming a chamber for said materials, means for introducing said materials into said chamber through the upper part thereof, heat insulating walls surrounding the upper part of said chamber, means for heating only those portions of said walls which are located above the materials in said chamber, a bottom closure for said chamber comprising hoppers through which said materials may be discharged, a supporting structure for said chamber forming an enclosure around the lower parts of said hoppers, and means for heating the said enclosure.

4. A storage bin for preserving in a dry state finely divided perishable materials, comprising walls forming a chamber for said materials, said materials completely filling said chamber except for an air space above and in contact with said materials, heat insulating means surrounding the upper part of said chamber, heating means between said walls and said heat insulating means above the upper level of the materials in said chamber for controlling the relative temperatures of the air in the space above said materials and the walls surrounding said space to prevent the condensation of moisture in said space, means for forming an enclosure beneath said chamber, and means for heating said enclosure for the comfort of workmen therein.

5. A storage bin for preserving in a dry state finely divided perishable materials, comprising an annular upright wall, a top wall united with said annular wall and having means for introducing finely divided dry materials therethrough into the space within said annular wall, heat insulating material on the outer sides of said annular wall and of said top wall, and heating means between said top wall and the heat insulating means located above said top wall for controlling the temperature of the portions of said walls around said space and preventing the condensation of moisture in said space.

6. A storage bin for preserving in a dry state finely divided perishable materials, comprising an annular unheated upright wall, a metallic top wall over the upper end of said annular wall, an inlet conduit extending through the central portion of said top wall for introducing said materials into the space within said annular wall, means mounted beneath said inlet conduit for spreading the materials discharged by said conduit over the area within said annular wall, and heating means for controlling the relative temperatures of the air in contact with the upper surface of said materials and of the portions of said walls surrounding the space above said materials and thereby maintaining the temperature of the walls in contact with the air space above said materials higher than the temperature of the air in said space.

7. A storage bin for the preservation and sanitary storage in a dry state of finely divided perishable materials throughout severe temperature and moisture variations, comprising thermally insulated side walls, a bottom closure having at least one discharge hopper, a top closure having inner and outer walls with heat insulating materials therebetween and means extending therethrough for the introduction of finely divided materials into the space within said side walls, and heating means in said top closure on the inner side of the insulating material therein.

References Cited in the file of this patent

UNITED STATES PATENTS

| | | |
|---|---|---|
| 460,624 | Zimmerman et al. | Oct. 6, 1891 |
| 1,028,712 | Gregory | June 4, 1912 |
| 1,313,436 | Webster | Aug. 19, 1919 |
| 1,407,666 | Lehman | Feb. 21, 1922 |
| 1,613,547 | Telford | Jan. 4, 1927 |
| 1,626,389 | Butler | Apr. 26, 1927 |
| 2,120,269 | Sloan | June 14, 1938 |
| 2,199,196 | Evans | Apr. 30, 1940 |
| 2,230,460 | Kleinwachter | Feb. 4, 1941 |
| 2,238,511 | Thaxter | Apr. 15, 1941 |
| 2,293,961 | Zimmerman | Aug. 25, 1942 |
| 2,362,117 | David | Nov. 7, 1944 |
| 2,392,240 | Frankel | Jan. 1, 1946 |